Figure 1:
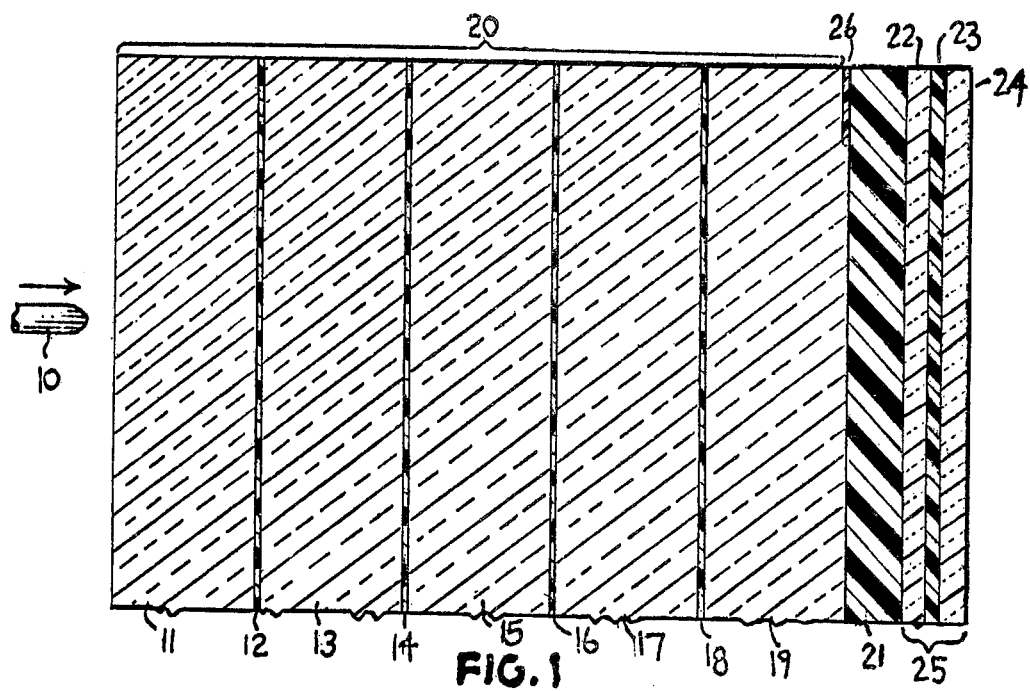

United States Patent [19]

Littell, Jr. et al.

[11] 4,130,684
[45] Dec. 19, 1978

[54] MULTILAYERED SAFETY GLASS

[75] Inventors: Harry E. Littell, Jr., Allison Park; Shorr, Norman, Mount Lebanon, both of Pa.

[73] Assignee: PPG Industries, Inc., Pittsburgh, Pa.

[21] Appl. No.: 831,286

[22] Filed: Jun. 9, 1969

Related U.S. Application Data

[63] Continuation-in-part of Ser. No. 819,045, Apr. 24, 1969, Pat. No. 3,864,204.

[51] Int. Cl.² ............................ B32B 7/02; F41H 5/26
[52] U.S. Cl. ................................. 428/212; 428/215; 428/217; 428/437; 428/911
[58] Field of Search ............... 89/36 A; 109/10, 58.5, 109/80; 161/166, 192, 198, 199, 404; 428/212, 215, 217, 439, 911

[56] References Cited

U.S. PATENT DOCUMENTS

| | | | |
|---|---|---|---|
| 3,424,642 | 1/1969 | Orcutt | 161/199 |
| 3,437,552 | 4/1969 | Bowen | 161/199 |

*Primary Examiner*—Stephen C. Bentley
*Attorney, Agent, or Firm*—Edward I. Mates

[57] ABSTRACT

A multilayered safety glass laminate comprising a plurality of alternate plies of glass and thermoplastic transparent interlayers of plasticized polyvinyl butyral resin arranged to provide an impact striking section, a transition section and an impact absorption section. The plasticizer content of the resin in the impact striking section is relatively low to impair projectile penetration and that of the plasticized polyvinyl butyral in the transition section and, if present, in the impact absorption section, relatively high to reduce the severity of spall.

6 Claims, 2 Drawing Figures

MULTILAYERED SAFETY GLASS

This application is a continuation-in-part of application Ser. No. 819,045 of Norman Shorr and Harry E. Littell, Jr., filed Apr. 24, 1969, now U.S. Pat. No. 3,864,204 for MULTILAYERED SAFETY GLASS.

This invention relates to transparent armor plate frequently referred to as MULTIPLATE ® SAFETY GLASS. This name is commonly given to laminated glass-plastic windows comprising alternate plies of glass and transparent thermoplastic interlayers suitable to resist the penetration of bullets or other projectiles through their thickness.

Bullet resisting glass structures are designed to afford protection against bullets of a particular class and/or range of velocities. Generally speaking, when protection is desired against non-military devices, bullet resisting glass structures need only protect against light or medium calibre ball-type projectiles. Bullet resisting glass structures intended to afford protection for military combatants must also protect against higher calibre, higher velocity, ball and armor piercing projectiles. In addition, it is desired to have minimal a real density (weight per unit area of laminated window) consistent with adequate bullet-resisting performance for military vehicles. Multilayered glass for tanks should be as light as possible for a given bullet-resisting capability to permit the tanks to operate with maximum velocity and maneuverability for a given size engine. Multilayered safety glass windows for aircraft likewise are desired to be as light as possible to permit planes to carry as much equipment and/or armament as is possible to still provide relative safety for the occupants of the aircraft.

Multilayered safety glass is strengthened by increasing the number of plies of glass alternated with thermoplastic interlayers to improve the resistance of the multilayered safety glass laminate to impinging projectiles. However, such strengthening requires added mass, which reduces the payload and/or speed of the vehicle in which the safety glass is installed.

Conventional, transparent, bullet-resisting glass laminates are fabricated by assembling alternate plies of glass and plastic sheeting together and exposing the assembly to an elevated temperature and pressure to bond the plies. Each glass ply of conventional bullet-resisting glass laminates may be of equal glass thickness or of a symmetrical arrangement of thicknesses and each plastic interlayer ply is of equal plastic thickness, with the exception that, in certain structures, the innermost glass plies of certain laminates are thinner than the other plies. Some variations of conventional structure prior to the present invention involved increasing thickness of at least one of the glass plies and/or one of the plastic plies. Another variation involved substituting a rigid, thin sheet of light weight but easily scratched polycarbonate material for the innermost glass ply.

The transparent plasticized interlayer material is composed of a polyvinyl acetal such as plasticized polyvinyl butyral resin. This material is prepared as recited in U.S. Pat. No. 2,400,957 to Stamatoff, and is commonly used as the interlayer of laminated glass windshields because of its adhesion to glass when subjected to suitable temperatures and pressure, because it is transparent when bonded between two sheets of glass and because of its resistance to elongation whenever an object impacts upon a laminated safety glass window such as the multilayered safety glass laminate described herein. There are many well-known plasticizers suitable for use with polyvinyl butyral disclosed in U.S. Pat. No. 2,526,728 to Burk et al. The most commonly used are monocarboxylic aliphatic acid esters of ether glycols, such as triethylene glycol di-2 ethyl butyrate.

There are two types of plasticized polyvinyl butyral in general use today. They are commonly called "aircraft vinal" and "automotive vinal." "Aircraft vinal" contains 21 parts by weight of triethylene glycol di-(2-ethyl butyrate) plasticizer per 100 parts by weight of polyvinyl butyral, while "automotive vinal" contains 41 parts by weight of said plasticizer per 100 parts by weight of polyvinyl butyral. The different amounts of plasticizer are added to improve the superiority of a safety glass laminate to withstand penetration at different temperatures of use. Thus, "aircraft vinal" containing a lesser plasticizer content, has its optimum penetration resistance at higher temperatures and "automotive vinal" containing a greater plasticizer content, has its optimum penetration resistance at lower temperatures.

The term "low plasticizer content" as used in the description of preferred embodiments of the present invention preferably refers to less than 25 parts by weight of triethylene glycol di-(2-ethyl butyrate) plasticizer per 100 parts of resin, while the term "high plasticizer content" refers to more than 35 parts by weight of said plasticizer per 100 parts of resin. These terms also refer to relative amounts of other known plasticizers that produce equivalent plasticizing results on polyvinyl butyral.

In the following description, the term "interlayer" describes elastomeric plasticized polyvinyl butyral resin positioned between adjacent plies of glass, regardless of whether such resin is initially positioned as single sheet or layer of elastomer or as several sheets or layers of elastomer. Polyvinyl butyral sheeting comes in various thicknesses, but it is still necessary to assemble several layers of interlayer material to form certain thicknesses of interlayer which are not available commercially, such as the thickness required for the impact transition portion.

Multilayered safety glass laminates offer two primary safety advantages. In the event of impact by a projectile, the bonding between the glass and the interlayers holds the glass articles in the same relative position, thereby preventing the possibility of injury as a result of flying glass. Holding the particles in the same relative position also limits the possibility of having sharp edges of broken glass exposed. Another advantage of the multilayered safety glass laminate is due to the physical properties of the interlayer materials. Unlike glass and other rigid materials, an elastomer stretches prior to rupture rather than breaking immediately when subjected to impact. On impact, an elastomer elongates, thereby absorbing energy from the impacting object and reducing the velocity of the impacting object. In many instances, the velocity of the impacting object is reduced to zero before the object or projectile penetrates the elastomer.

When an elastomer such as polyvinyl butyral is employed as an interlayer between adjacent glass sheets, such a laminate retains some of the elastomeric properties of the elastomer. Thus, when impacted, a windshield consisting of alternate sheets of glass and interlayers will elongate in the immediate area of impact by the projectile, thereby absorbing energy from the object and reducing its velocity. This property of a multilayered safety glass laminate will be referred to as penetration resistance for the purpose of describing the present invention.

What has been described thus far are the various combinations of prior art laminates. An efficient multilayered safety glass unit comprises an impact striking section that faces the direction from which an impacting projectile comes and that comprises two or more relatively thick glass sheets adhered together by relatively thin, transparent thermoplastic interlayers; an impact transition section consisting essentially of a relatively thick layer of thermoplastic material; and an impact absorption section, which in the past has consisted of a sheet of glass or rigid plastic such as a polycarbonate. In many cases, the impact absorption section is made of glass rather than plastic to improve its resistance to abrasion, its clarity and its resistance to humidity conditions.

When such a multiplate safety glass laminate is used at low temperatures such as $-65°$ F. and lower, the relatively thick plastic of the impact transition section causes the glass sheet of the impact absorption section, which glass sheet has a lower coefficient of expansion, to spall. This spalling results from the fact that the force of adhesion between the interlayer material and the glass is greater than the cohesion between molecules of the glass. The greater adhesion force causes a tension force at the plastic facing surface of the glass sheet. The tension force is a function of the thickness of the plastic interlayer so that the force tending to cause spalling in the glass sheet of the impact absorption section can result in spall on ballistic impact that can be injurious to personnel occupying a vehicle glazed with the multilayered safety glass laminate described above.

If the glass sheet used for the impact absorption section is relatively thin, the glass spall produced is powdered, but provides insufficient counter force to the relatively rapidly shrunk plastic when used in a cold environment to prevent spalling at a temperature relatively close to but below normal room conditions. A thick glass impact absorption portion provides greater resistance to cold chipping than one having a thinner glass sheet, but has greater tendency to eject spall on ballistic impact. Thus, an impact absorption portion composed of an innermost thick glass sheet is not as safe as one composed of an innermost thin glass sheet.

An invention of the present applicants described and claimed in the aforesaid parent application Ser. No. 819,045, filed Apr. 24, 1969, now U.S. Pat. No. 2,864,204, provides an impact absorption section of sufficient total thickness to provide sufficient counterforce to reduce the frequency of glass spalling, and yet provides a device whereby if spall is created, it is not of such a nature as to be injurious to personnel. This improvement is provided by substituting a laminate, consisting essentially of two relatively thin sheets of glass and an interlayer of intermediate thickness, for the glass sheet previously used as the impact absorption section. The laminated impact absorption section comprising two sheets of glass and a plastic interlayer provides sufficient rigidity and a sufficient counter force to the rapid shrinking of the relatively thick plastic layer of the impact transition section to minimize the frequency of cold chipping when the laminate is exposed to low temperatures.

The laminated impact absorption section behaves in a manner similar to a relatively thick glass sheet in countering the shrinkage force of the relatively thick plastic interlayer which comprises the impact transition section. This behavior of the laminate as a thick sheet inhibits the tendency of the inner glass sheet of the impact absorption section to warp in the direction of shrinkage of the thick interlayer sheet of the impact transition section. In addition, if spalling does occur, the thinness of the glass sheets of the impact absorption section enables the glass to spall into relatively harmless fragments of a small powdery nature under ballistic impact. Furthermore, the plastic interlayer of the laminated impact absorption section also shrinks when the thick plastic sheet of the impact transition section shrinks in response to exposing the multiplate to low temperatures. This interlayer shrinkage provides a partially counterbalancing force to the warping force imparted by the shrunk impact transition section on the inner glass sheet of the laminated impact absorption section and divides the cold chipping inducing force between the glass sheets comprising the laminated impact absorption section in a ratio approximating the thickness of the interlayer of the impact absorption section to that of the plastic sheet of the impact transition section. If desired, the spalling force on the laminated impact absorption section may be reduced by applying a parting material between the margin of the inner glass sheet surface of the impact striking section and the impact transition section.

The present invention provides further improvement in the construction of multilayered safety glass. It has now been found that the spalling force is further reduced when the transition section layer of polyvinyl butyral resin of the multilayered laminate has an increased amount of plasticizer, regardless of whether the impact absorption portion is laminated or a single sheet. However, the outer plies of said plastic resin in the impact striking section must have a lesser plasticizer content in order for the laminate to have optimum penetration resistance. Thus, the present invention involves suggesting multilayered laminates having relatively hard polyvinyl butyral resin interlayers of relatively low plasticizer content in the impact striking section to provide optimum penetration resistance and an innermost ply of relatively soft polyvinyl butyral resin of relatively high plasticizer content adjacent the innermost glass ply to minimize damage due to spalling. In cases where the impact absorption section is a glass-polyvinyl butyral resin laminate, the polyvinyl butyral resin laminate of the impact absorption section of the laminate should also have a relatively high plasticizer content.

A typical embodiment of the present invention will be described in detail to illustrate the principle by which the present invention operates. It is understood that variations can be made within the scope of the claimed subject matter that is recited following the description of the illustrative embodiment, but that optimum results are obtained when the innermost glass sheet has a maximum thickness of 0.100 inch to provide relatively harmless, powdery fragments if glass spalling occurs.

Figure 2:
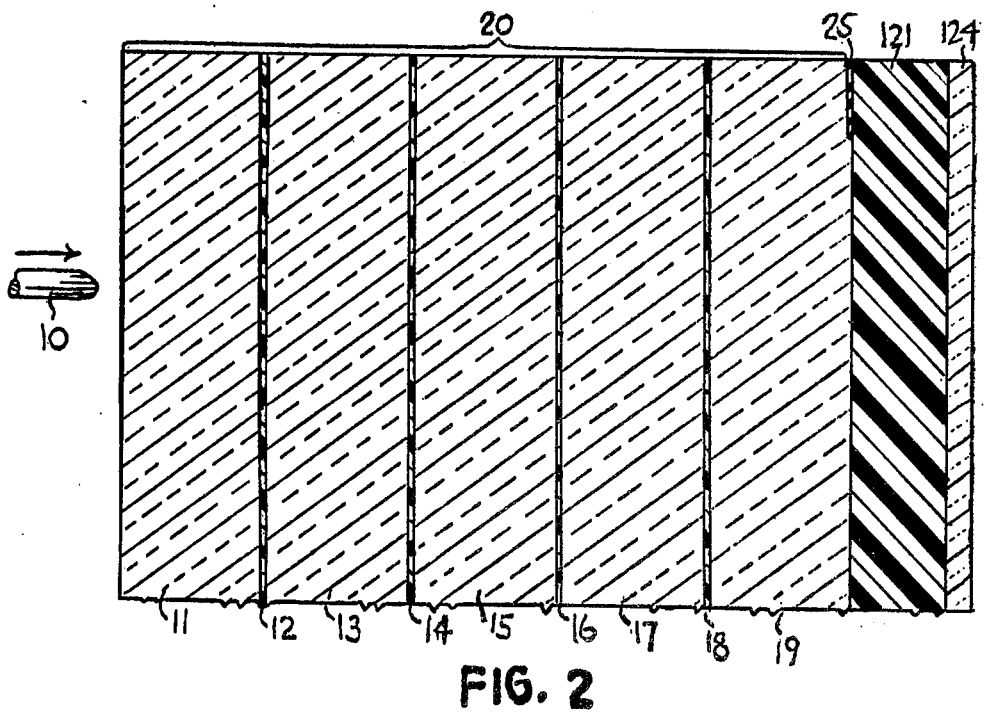

In the drawings which form part of the description, and wherein FIGS. 1 and 2 are fragmentary cross-sectional views of alternate embodiments, a projectile 10 is showing approaching a multilayered safety glass laminate constructed in accordance with the present invention.

In the multilayered safety glass laminate construction depicted, an outward facing glass sheet 11, one-half inch thick, has inwardly thereof an interlayer 12 of plasticized polyvinyl butyral resin of 0.020 inch thickness containing 21 parts by weight triethylene glycol di-(2-ethyl butyrate) plasticizer per 100 parts of said resin. Behind the latter is another glass sheet 13, which is followed by another interlayer sheet 14, another glass sheet 15, another plastic interlayer sheet 16, another glass sheet 17, and another interlayer sheet 18 and another glass sheet 19.

The glass sheets 11, 13, 15, 17 and 19 are of equal thickness, and the interlayer sheets 12, 14, 16 and 18 are of equal thickness less than that of the glass sheets and and all have relatively low plasticizer content (less than the equivalent of 25 parts by weight of the aforesaid plasticizer per 100 parts of resin). Plies 11 to 19 inclusive comprise the impact striking section 20 of the transparent multilayered safety glass laminate.

Inward of the impact striking section 20 is an impact transition section 21. The latter comprises relatively thick, plasticized polyvinyl butyral resin having a relatively high plasticizer content, greater than the equivalent of 35 parts by weight of the aforesaid plasticizer per 100 parts of resin, for example, 41 parts by weight of the aforesaid plasticizer per 100 parts of resin. In the illustrative embodiment depicted in FIG. 1, the thermoplastic interlayer of the impact transition section is 0.180 inch thick and may comprise 6 layers of plastic 0.030 inch thick or 9 layers of 0.020 inch thick plastic or 12 layers of 0.015 inch thick plastic.

Attached to the interior surface of the relatively thick plastic sheet of the impact transition section 21 is a laminated impact absorption section 25. The latter comprises a penultimate glass sheet 22 attached to a plastic interlayer 23 of intermediate thickness (about 0.090 inch) having a high plasticizer content, such as 41 parts by weight of said plasticizer per 100 parts of resin, and an innermost glass sheet 24. The penultimate glass sheet or ply 22 and the innermost glass sheet or ply 24 are each about 5/64 inch thick. The glass sheets 22 and 24 are thinner than the glass sheets of the impact striking section 20, while the plastic interlayer 23 is thicker than the plastic interlayers of the impact striking section 20, but thinner than the plastic sheet constituting the impact transition section 21.

A thin frame of parting material 26 is applied to the marginal portion of the major surface of glass sheet 19 that faces the relatively thick plastic interlayer sheet 21 to reduce the tendency for cold-chipping of the sheet 19. A typical parting material is Scotch Tape sold by Minnesota Mining and Manufacturing Company of St. Paul, Minnesota. The parting material forms a border one-fourth inch wide. The adhesive surface of the Scotch Tape is applied against the border of the glass sheet 19 so that the smooth surface facing the relatively thick interlayer 21 is free to move along its marginal portion to alleviate somewhat the tendency of the thick glass sheet 19 to chip at low temperatures.

In the alternate embodiment depicted in FIG. 2, the impact striking portion 20 contains alternate glass sheets 11, 13, 15, 17 and 19 and polyvinyl butyral resin sheets 12, 14, 16 and 18 of relatively low plasticizer content identical to that of the FIG. 1 embodiment. The impact transition portion of this embodiment comprises a sheet 121 of plasticized polyvinyl butyral resin having the plasticizer content of interlayer 21 of the FIG. 1 embodiment, but having a thickness of 0.350 inch. The impact absorption portion of the FIG. 2 embodiment consisted of a single glass sheet 5/64 inch thick.

The following sets of laminates were fabricated in order to determine the benefits of the present invention. Two groups of samples were prepared for the first two ballistic tests reported below. One group conformed to the construction of the present invention and the other group, the control group, differed only in the arrangement of plasticizer contents of the interlayers as described below.

The laminates for the first two ballistic tests conforming to the present invention had an impact striking section comprising 4 plies of glass one-half inch thick with adjacent glass plies bonded together with polyvinyl butyral plasticized with 21 parts by weight of triethylene glycol di-(2-ethyl butyrate) plasticizer per 100 parts of polyvinyl butyral. The polyvinyl butyral was prepared with as low a moisture content as possible to improve its adhesion to the glass. The impact striking section of all samples tested had 4 glass plies instead of 5 glass plies illustrated in order to take full advantage of the range of projectile velocities available with the test equipment used.

The samples for the first ballistic test conforming to the present invention had an impact transition section of polyvinyl butyral approximately 0.350 inch thick containing 41 parts by weight of plasticizer added to 100 parts of polyvinyl butyral and an impact absorption section consisting of a plate of sheet glass 5/64 inch thick. This construction is illustrated in FIG. 2. The samples for the second ballistic test conforming to the present invention had an impact transition section of the same plasticizer content as the first test samples with a thickness of 0.180 inch and a laminated impact absorption section comprising two plates of sheet glass 5/64 inch thick with an interlayer of polyvinyl butyral 0.090 inch thick having the same plasticizer content sandwiched between the two plates of sheet glass. This latter construction is depicted in FIG. 1.

For each of the first two ballistics tests reported, the control laminates were substantially identical to the test samples conforming to the present invention except for the fact that all the sheets of plasticized polyvinyl butyral resin of the control laminates had 41 parts by weight of the aforesaid plasticizer per 100 parts of said polyvinyl butyral resin.

Each of the samples tested were prepared by assemblying the glass plies and plastic sheets in the order named hereinabove, inserting them within a plastic bag, evacuating the bag and subjecting the assembly within the evacuated bag to an oil autoclave at a pressure of 200 pounds per square inch and a temperature of about 275° F. for about 45 minutes. Each of the test samples was removed from the evacuation bag after the temperature and pressure was reduced gradually to room conditions.

A set of units of each type was subjected to ballistic tests, the results of which follow. The ballistic tests involved shooting 30 calibre bullets from a uniform distance. A thin sheet of aluminum foil 2 mils thick was located six inches behind each unit tested to serve as a witness plate that showed damage due to spalling of the innermost glass sheet of each tested laminate. The appearance of each witness plate was noted. While the exact velocities of the impacting bullets is classified, the relative velocities reported shows the improved resistance to penetration that results from substituting laminates having interlayers of relatively low plasticizer content in the impact striking portion and relatively high plasticizer content in the rearmost ply or plies of plastic resin for laminates having all interlayers of high plasticizer content.

In the first two tests reported, using 30 calibre projectiles at various velocities against the samples having a thicker impact transition portion and a single plate of sheet glass as the impact absorption portion as depicted in FIG. 2, and the samples of the same total thickness, but having a thinner impact transition portion and a laminated impact absorption portion as depicted in FIG. 1, the exact velocities cannot be given because they represent classified information. However, when samples constructed according to the present invention were subjected to projectiles traveling assigned relative velocities of 100% at which spall perforated the witness plates, the first types of control samples having interlayers of uniformly high plasticizer content had spall perforate the witness plates at relative velocities of 96% in the first test and at 92% in the second test. It was concluded from this test that multilayered laminates having all their plastic interlayers with high plasticizer content have less penetration resistance to projectiles than those constructed according to the present invention.

A comparison of the two ballistics tests also demonstrated the superiority of the laminated impact absorption portions depicted in FIG. 1 over the monolithic construction of the impact absorption portions depicted in FIG. 2 in both penetration resistance and spall damage. Projectiles at higher impact velocities impinging on the multilayered laminates constructed with laminated impact absorption sections produced less dangerous spall than projectiles impinging at lower velocities on those having monolithic impact absorption sections. Since the amount of spall increases with increasing velocity of the impinging projectile, it is obvious that the present construction is safer than prior art constructions.

The first two ballistic tests reported above demonstrated the superiority with respect to penetration resistance of the multilayered laminates having interlayers of different plasticizer content arranged as taught by the present invention over those having all interlayers of high plasticizer content, as well as the superiority of the FIG. 1 embodiment over that of the FIG. 2 embodiment. Another ballistic test was performed to compare the penetration resistance of the FIG. 1 embodiment having interlayers of plasticizer content arrangement according to the present invention with those having all interlayers having low plasticizer content. All the samples in this final ballistic test had 4 glass plies in the impact striking portion. The test samples were identical to the test samples of the second ballistic test reported above as conforming to the present invention, while the control samples had all the polyvinyl butyral resin plies with a low plasticizer content of 21 parts by weight of said plasticizer per 100 parts by weight of resin. The ballistic test setup and the method of lamination were identical to those described for the prior tests. The velocity at which there was perforation of the witness plates behind the test samples conforming to the FIG. 1 embodiment of the present invention was assigned a ballistic limit of 100%, whereas the control samples having interlayers of low plasticizer content showed perforation of the witness plates at only 90% of said ballistic limit.

It was concluded from the tests described above that a multilayered laminated glass-plastic window having polyvinyl butyral resin interlayers of low plasticizer content in the impact striking portion and of high plasticizer content in the impact transition portion provided penetration resistance better than a window having all its interlayers of high plasticizer content and better than a window having all its interlayers of low plasticizer content. In addition, if the window comprises a laminated impact absorption portion, further improved safety with respect to spall damage occurs when the interlayer of the impact absorption portion has a high plasticizer content.

What is claimed is:

1. In a multilayered safety glass laminate comprising a plurality of alternate plies of glass and plasticized polyvinyl butyral resin arranged to provide an impact striking section, a transition section and an impact absorption section, the improvement comprising a plurality of plies of said resin in said impact striking section having a relatively low plasticizer content equivalent to less than 25 parts by weight of triethylene glycol di-(2-ethyl butyrate) per 100 parts of said resin and said transition section comprising said plasticized polyvinyl butyral resin having a relatively high plasticizer content equivalent to more than 35 parts by weight of triethylene glycol di-(2-ethyl butyrate) per 100 parts of said resin.

2. In a multilayered safety glass laminate as in claim 1, wherein said impact absorption section is laminated and comprises a ply of said polyvinyl butyral resin having a relatively high plasticizer content equivalent to more than 35 parts by weight of triethylene glycol di-(2-ethyl butyrate) per 100 parts of said resin.

3. In a multilayered safety glass laminate as in claim 1, wherein said impact absorption section comprises an innermost glass ply having a maximum thickness of 0.100 inch.

4. In a multilayered safety glass laminate as in claim 1, wherein said plurality of plies of said polyvinyl butyral resin in said impact striking section are each relatively thin and said plasticized polyvinyl butyral resin in said transition section is approximately 6 to 18 times thicker than any of said plies of resin in said impact striking section.

5. In a transparent, multilayered safety glass laminate comprising a plurality of alternate plies of glass and plasticized polyvinyl butyral resin arranged to provide an impact striking section, a transition section and an impact absorption section, the improvement comprising a plurality of plies of said resin in said impact striking section having a relatively low plasticizer content and said transition section comprising said resin having a plasticizer content at least 40% higher than that of said resin in said impact striking section.

6. In a multilayered safety glass laminate as in claim 5, wherein said impact absorption section is laminated and comprises a ply of polyvinyl butyral resin having a plasticizer content at least 40% higher compared to that of said resin in said impact striking section.

* * * * *